United States Patent
Blanchet et al.

(10) Patent No.: US 12,021,275 B2
(45) Date of Patent: Jun. 25, 2024

(54) UNDULATING STRUCTURE FOR FUEL CELL FLOW FIELD

(71) Applicant: NUVERA FUEL CELLS, LLC, Billerica, MA (US)

(72) Inventors: Scott Blanchet, Chelmsford, MA (US); Roger Van Boeyen, Westford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 17/302,906

(22) Filed: May 14, 2021

(65) Prior Publication Data

US 2022/0037676 A1    Feb. 3, 2022

Related U.S. Application Data

(60) Provisional application No. 63/025,615, filed on May 15, 2020.

(51) Int. Cl.
| | | |
|---|---|---|
| *H01M 8/026* | (2016.01) | |
| *H01M 8/0232* | (2016.01) | |
| *H01M 8/0263* | (2016.01) | |

(52) U.S. Cl.
CPC ......... *H01M 8/026* (2013.01); *H01M 8/0232* (2013.01); *H01M 8/0263* (2013.01)

(58) Field of Classification Search
CPC .................................................... H01M 8/026
See application file for complete search history.

(56) References Cited

U.S. PATENT DOCUMENTS

| | | | |
|---|---|---|---|
| 6,541,147 B1 | 4/2003 | Mclean et al. | |
| 2003/0224236 A1* | 12/2003 | Morita | H01M 8/021 |
| | | | 429/508 |
| 2004/0247927 A1 | 12/2004 | Kurz | |

(Continued)

FOREIGN PATENT DOCUMENTS

| | | |
|---|---|---|
| EP | 2835852 A1 | 2/2015 |
| WO | 2012072538 A1 | 6/2012 |

(Continued)

OTHER PUBLICATIONS

WO2014093876 (Year: 2014).*
International Search Report dated Aug. 11, 2021 for International Application No. PCT/US2021/032587.

*Primary Examiner* — Brian R Ohara
(74) *Attorney, Agent, or Firm* — Finnegan, Henderson, Farabow, Garrett & Dunner, LLP

(57) ABSTRACT

An undulating structure for use in a fuel cell includes a plurality of peaks and valleys. A method of making a structure for use in a fuel cell includes providing a mesh or screen sheet having one or more edges, forming the mesh or screen sheet into an undulating structure and treating one or more of the edges. A flow field for a fuel cell, comprising at least one metal mesh or screen, wherein the at least one metal mesh or screen includes a plurality of peaks and valleys. A fuel cell, comprising a first corrugated mesh or screen positioned within an anode of the fuel cell, a second corrugated mesh or screen positioned within a cathode of the fuel cell, and a membrane positioned between the first corrugated mesh or screen and the second corrugated mesh or screen.

16 Claims, 6 Drawing Sheets

(56) References Cited

U.S. PATENT DOCUMENTS

| | | | |
|---|---|---|---|
| 2010/0040926 A1* | 2/2010 | Blanchet | H01M 8/0234 |
| | | | 429/434 |
| 2010/0151359 A1 | 6/2010 | Tanaka et al. | |
| 2011/0053052 A1* | 3/2011 | Braun | H01M 8/0228 |
| | | | 429/535 |
| 2013/0244131 A1* | 9/2013 | Arcella | H01M 8/0254 |
| | | | 429/480 |

FOREIGN PATENT DOCUMENTS

| | | | | |
|---|---|---|---|---|
| WO | 2012143781 A1 | 10/2012 | | |
| WO | WO-2014093876 A1 * | 6/2014 | | H01M 10/04 |
| WO | 2018075870 A1 | 4/2018 | | |

* cited by examiner

UNDULATING STRUCTURE FOR FUEL CELL FLOW FIELD

This application claims the benefit of priority to U.S. Provisional Application No. 63/025,615, filed May 15, 2020, which is incorporated by reference in its entirety.

The present disclosure is directed to the field of polymer electrolyte membrane fuel cells.

A typical polymer electrolyte membrane (PEM) fuel cell (also known as a Proton Exchange Membrane fuel cell) has several components. It has a polymer membrane serving as an electrolyte, which provides the function of proton conductivity when sufficiently hydrated, as well as segregation of the highly reactive gases, i.e., hydrogen and oxygen. Catalysts are used to promote the electrochemical reactions that enable the cell to produce power—specifically to dissociate the hydrogen on the anode side into its constituent electrons and protons, and to form activated oxygen-containing species on the cathode side.

The anode electrode catalyst and the cathode electrode catalyst are typically applied to their respective sides of the cell in one of two ways: (1) in the form of a gas diffusion electrode (GDE), wherein the catalyst and its support are impregnated onto a gas diffusion media (typically a matte of pyrolized carbon or graphite fibers) placed between the reactant flow field and the membrane; or (2) in the form of a catalytically coated membrane (CCM), wherein the catalyst and its support are fixed onto an ionomeric extension of the polymer membrane surface on their respective sides. Regardless of which form is used, during assembly of the cell an electrical connection is established between the gas diffusion media and the polymer membrane, with the catalyst located in between. The side of the membrane that is in contact with an anode catalyst is the anode side, while the side of the membrane that is in contact with a cathode catalyst is the cathode side.

A fuel cell also has two separator plates (also known as "bipolar plates"), which serve to conduct electricity while segregating adjacent fluidic compartments. An anode compartment is the space that is between the anode side of the membrane and a separator plate. A cathode compartment is the space that is between the cathode side of the membrane and the separator plate.

A fuel gas, e.g., a hydrogen-containing gas, is fed to the anode compartment. An oxidant-containing gas, e.g., air, is fed to the cathode compartment. For the fuel cell to work, hydrogen must be able to reach the anode side of the membrane while oxygen must reach the cathode side. Electrically conductive spacers may be used to create passages in rite anode compartment or the cathode compartment respectively. These spacers, when present, also serve as the flow fields through which reactant gases and product water are convected. As used herein, the terms "flow field" and "flow field spacer" and "spacer," all of which refer to a component with multiple functions, are used interchangeably in this disclosure.

In one embodiment, the present disclosure is directed to a method of making a structure for a fuel cell, comprising providing a mesh or screen sheet having one or more edges; forming the mesh or screen sheet into an undulating structure; and treating one or more of the edges.

In one aspect, the structure may include one or more of a current collector mesh or screen, membrane support mesh or screen, flow field structure, and gas diffusion electrode. The method may include providing a mesh or screen sheet having one or more edges. The mesh or screen sheet may be formed of austenitic stainless steel, Chromium, Niobium, Zirconium, Nickel, Silver, Titanium, or alloys thereof. The mesh or screen sheet may include woven wire, wire cloth, or expanded metal. The method may include forming the mesh or screen sheet into an undulating structure. The undulating structure may include a corrugated feature, a serpentine feature, or a pleated feature. The undulating structure may be formed using a calendering roller, one or more rollers, a textile pleating machine, or cross-corrugation. The method may include treating one or more of the edges. One or more edges may be treated by hemming one or more of the edges, compressing one or more of the edges, folding one or more of the edges, encapsulating one or more of the edges, bending or brushing the freely exposed wires of one or more of the edges, or cutting one or more of the edges with a laser, plasma or other thermal cutting method. The method may additionally include pressing or flattening the undulating structure.

In another embodiment, the present disclosure is directed to a flow field for a fuel cell, comprising at least one metal mesh or screen, wherein the at least one metal mesh or screen include a plurality of peaks and valleys. In certain aspects, the plurality of meshes or screens may be metal, and may include cross-sections having a sinusoidal profile, a sawtooth profile, a trapezoidal profile, or a toroidal bead profile.

In another embodiment, the present disclosure is directed to a fuel cell comprising a first corrugated mesh or screen positioned within an anode of the fuel cell, a second corrugated mesh or screen positioned within a cathode of the fuel cell, and a membrane positioned between the first corrugated mesh or screen and the second corrugated mesh or screen. The fuel cell may include a 3.0 mm mesh or screen positioned within an anode of the fuel cell.

In a further embodiment, the present disclosure is directed to a fuel cell comprising a cathode, an anode, and a membrane interposed between the cathode and the anode, and a first open flow field comprising a first mesh or screen, wherein the first mesh or screen includes a plurality of corrugations.

In yet another embodiment, the present disclosure is directed to a fuel cell, comprising an open flow field having a general flow direction, wherein the flow permeability in a direction perpendicular to the general flow direction is higher than the flow permeability in a direction parallel to the general flow direction.

Another embodiment of the present disclosure is directed to an open flow field for a fuel cell having a flow direction, comprising at least one screen, mesh, foam, or expanded metal, and at least one flow channel, wherein the at least one flow channel extends in a direction intersecting the flow direction.

In a further embodiment, the present disclosure is directed to a fuel cell comprising a cathode, an anode, and a membrane interposed between the cathode and the anode, and an open flow field including a plurality of flow channels having a wave, zigzag, or sinusoidal shape, wherein the flow channels repeat across the open flow field.

The present disclosure is also directed to a fuel cell, comprising an anode open flow field having a plurality of channels having a repeating pattern including a first periodicity, and a cathode open flow field having a plurality of channels having a repeating pattern including a second periodicity, wherein the plurality of channels of the anode open flow field and the plurality of channels of the cathode open flow field are positioned such that the first periodicity and the second periodicity are out of phase by an amount ranging from 90 degrees to 270 degrees.

FIGS. 1A, 1B, and 1C illustrate a method of making an undulating structure for a fuel cell.

Figure 1A:
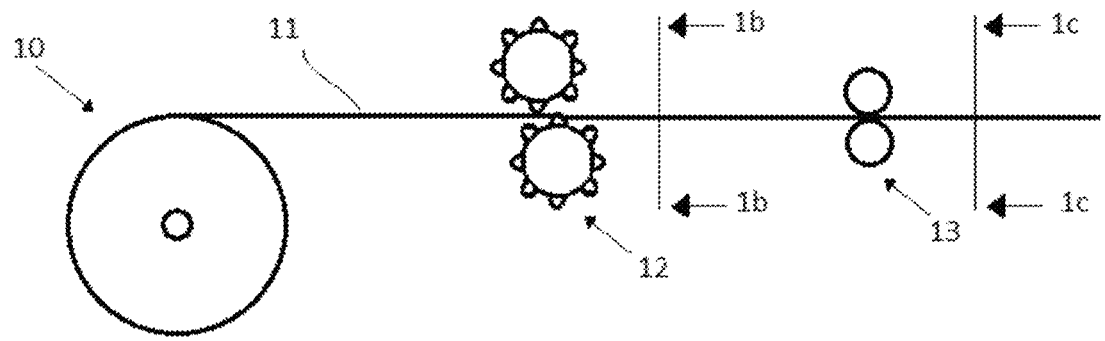

In accordance with a first aspect of the disclosure, a method of making a structure of for a fuel cell is illustrated in FIG. 1a. The structure may include any feature, component, or portion of a fuel cell. For example, the structure may be used to form an entire, flow field or may be used to form only a portion of a membrane support component, form all or a part of an electrode, current collector mesh or screen membrane support mesh or screen, spacers, flow field structure, gas diffusion electrode, or any other portion of a fuel cell.

In some embodiments, the structure may be a structure which consists of both structural material and accessible void space, where "structural material" means solid material and any inaccessible void space associated with it, where "accessible void space" means void space which is available to support the unrestricted flow of fluids through the porous structure, where the structure is "open" in the sense that any two points within the accessible void space of the structure can be connected by an imaginary smooth pathline residing entirely within the accessible void space of the structure, wherein the term "smooth" means that the pathline has a uniquely defined tangent vector at any point along it, wherein the phrase "support the unrestricted flow of fluids" means that for any afore mentioned pathline a non-interference criterion is satisfied, meaning that for any point on the pathline, a circle (a) having said point as its center, (b) lying in a plane normal to the pathline tangent vector at said point, and (c) having a radius of 5 microns, does not intersect any solid material, and wherein the term "within" means inside the convex hull of the structure when it is assembled with other components in a fuel cell configuration.

The structure may be formed of any desired material depending on its purpose. For example, the structure may be formed of metallic material such as austenitic stainless steel, Chromium, Niobium, Zirconium, Nickel, Silver, Titanium, or alloys thereof. In another aspect, the structure may include a non-metal component. The non-metal component may be electrically conductive, such as carbon fiber, carbon powder or a carbon coating. In another aspect, the structure may be made of a polymeric material suited for use within a fuel cell.

As shown in FIG. 1a, the structure may begin as a sheet of material 11. A sheet of material 11 may include any dimension or any shape. The sheet may be provided as a roll 10. Alternatively, the sheet of material 11 may be provided flat. The material may include a woven wire mesh, screen, perforated metal, metal felt or expanded metal. The weave or opening spacing may be uniform or vary. Mesh dimensions may range from 30 mesh to 500 mesh, where "mesh" means "number of filaments per linear inch." For example, in certain embodiments, the mesh dimensions are at least 50 mesh, at least 75 mesh, at least 100 mesh, at least 150 mesh, at least 200 mesh, at least 250 mesh, at least 300 mesh at least 350 mesh, at least 400 mesh, and at least 450 mesh. The weave may include any style. For example, the weave style may be plain, twill, Dutch, lock-crimp, or any style that allows for the formation of openings or spaces between filaments. Expanded metal may be formed to have any shape gap or opening. For example, the gap or opening, may be round, oval, square, rectangular, flat, diamond, or any other polygonal or single-sided shape. Alternatively, the opening may include a narrow slit or slot. Additionally, the material may start in an annealed state, a quarter-hard state, half-hard state, or any other appropriate heat-treated state.

Wire forming the mesh or screen sheet may have a diameter in the range of 0.0005 inch to 0.015 inch. For example, in certain embodiments, the diameter may be at least 0.001 inch, at least 0.005 inch, and at least 0.01 inch. The diameter may be consistent or may vary throughout the mesh or screen. For example, a first diameter wire may form a first portion of the weave, while a second diameter wire may form a second portion of the weave. A third wire having a third diameter may form a third portion of the weave, and so on. Additionally, a wire may have a first diameter at a first portion and a second diameter at a second portion.

As illustrated in FIG. 1a, the mesh or screen sheet 11 may be provided on a nail 10, The mesh or screen sheet 11 may include one or more edges, and may have any desired shape. Although, a square or rectangular shape may be desirable for ease of manufacturing. The width of the mesh or screen sheet may vary depending on the desired use of the structure. For example, when used as a cathode or on the cathode side of the fuel cell, the width may range from 10 min to 1000 mm wide. In certain embodiments, the width may be at least 10 mm, at least 25 mm, at least 50 mm, at least 75 mm, at least 100 mm, at least 125 mm, at least 150 mm, at least 175 mm, at least 200 mm, at least 250 mm, at least 300 mm, at least 400 mm, and at least 500 mm. In these embodiments, the with may be 1000 mm or less, 900 mm or less, 800 mm or less, 750 mm or less, 700 mm or less, 600 mm or less, 500 mm or less, 400 mm or less, 300 mm or less, 250 mm or less, 200 mm or less, and 175 or less. Further to these embodiments, it is contemplated that the range of width encompass any combination of the lower and upper ranges disclosed in the two preceding sentences. Accordingly, non-limiting exemplary ranges of width include from: 10 mm to 800 mm, 10 mm to 600 mm, 10 mm to 400 mm, 10 mm to 250 mm, 10 mm to 200 mm, 10 mm to 175, 25 mm to 1000 mm, 25 mm to 800 mm, 25 mm to 600 mm, 25 mm to 400 mm, 25 mm to 230 mm, 23 mm to 200 mm, 25 mm to 175, 50 mm to 1000 mm, 50 mm to 800 mm, 50 mm to 600 mm, 50 mm to 400 mm, 50 mm to 250 mm, 50 mm to 200 mm, 50 mm to 175, 75 mm to 1000 mm, 75 mm to 800 mm, 75 mm to 600 mm, 75 mm to 400 mm, 75 mm to 250 mm, 75 mm to 200 mm, 75 mm to 175, 100 mm to 1000 mm, 100 mm to 800 mm, 100 mm to 600 mm, 100 mm to 400 mm, 100 mm to 250 mm, 100 mm to 200 mm, 100 mm to 175, 125 mm to 1000 mm, 125 mm to 800 mm, 125 mm to 600 mm, 125 mm to 400 mm, 125 mm to 250 mm, 125 mm to 200 mm, 125 mm to 175 mm, 150 mm to 1000 mm, 150 mm to 800 mm, 150 mm to 600 mm, 150 mm to 400 mm, 150 mm to 250 mm, 150 mm to 200 mm, 150 mm to 175, 175 mm to 1000 mm, 175 mm to 800 mm, 175 mm t. 600 mm, 175 mm to 400 mm, 175 mm to 250 mm, 200 mm to 1000 mm, 200 mm to 800 mm, 200 mm to 600 mm, 200 mm to 400 mm, 200 mm to 250 mm, 250 mm to 1000 mm, 250 mm to 800 mm, 250 mm to 600 mm, 250 mm to 400 mm, 300 mm to 1000 mm, 300 mm to 800 mm, 300 mm to 600 mm, and 300 mm to 400 mm.

Alternatively, when used as an anode or on the anode side of the fuel cell, the width be range from 10 mm and 1000 mm. In certain embodiments, the width may be at least 10 mm, at least 25 mm, at least 50 mm, at least 75 mm, at least 100 mm, at least 175 mm, at least 150 mm, at least 175 mm, at least 200 mm, at least 250 mm, at least 300 mm, at least 400 mm, and at least 500 mm. In these embodiments, the width may be 1000 mm or less, 900 mm or less, 800 mm or less, 750 mm or less, 700 mm less, 600 mm or less, 500 mm or less, 400 mm or less, 300 mm or less, 250 mm or less, 200 mm or less, and 175 or less. Further n these embodiments, it is contemplated that the range of width encompass any combination of the lower and upper ranges disclosed in the two preceding sentences. Accordingly, non-limiting exemplary ranges of width include from: 10 mm to 800 mm, 10 mm to 600 mm, 10 mm to 400 mm, 10 mm to 250 mm, 10 mm to 200 mm, 10 mm to 175, 25 mm to 1000 mm, 25 mm to 800 mm, 25 mm to 600 mm, 25 mm to 400 mm, 25 mm to 250 mm, 25 mm to 200 mm, 25 mm to 175, 50 mm to 1000 mm, 50 mm to 800 mm, 50 mm to 600 mm, 50 mm to 400 mm, 50 mm to 250 mm, 50 mm to 200 mm, 50 mm to 175, 75 mm to 1000 mm, 75 mm to 800 mm, 75 mm to 600 mm, 75 mm to 400 mm, 75 mm to 250 mm, 75 mm to 200 mm, 75 mm to 175, 100 mm to 1000 mm, 100 mm to 800 mm, 100 mm to 600 mm, 100 mm to 400 mm, 100 mm to 250 mm, 100 mm to 200 mm, 100 mm to 175, 125 mm to 1000 mm, 125 mm to 800 mm, 125 mm to 600 mm, 125 mm to 400 mm, 125 mm to 250 mm, 125 mm to 200 mm, 125 mm to 175, 150 mm to 1000 mm, 150 mm to 800 mm, 150 mm to 600 mm, 150 mm to 400 mm, 150 mm to 250 mm, 150 mm to 200 mm, 150 mm to 175, 175 mm to 1000 mm, 175 mm to 800 mm, 175 mm to 600 mm, 175 mm to 400 mm, 175 mm to 250 mm, 200 mm to 1000 mm, 200 mm to 800 mm, 200 mm to 600 mm, 200 mm to 400 mm, 200 mm to 250 mm, 250 mm to 1000 mm, 250 mm to 800 mm, 250 mm to 600 mm, 250 mm to 400 mm, 300 mm to 1000 mm, 500 mm to 800 mm, 500 mm to 600 mm, and 300 mm to 400 mm.

These widths set forth in the previous two paragraphs are for illustrative purposes only. It is understood that the rolls according to the present disclosure may be provided with any width, and that a desired width may be achieved by cutting the structure to a desired width.

Figure 1B:
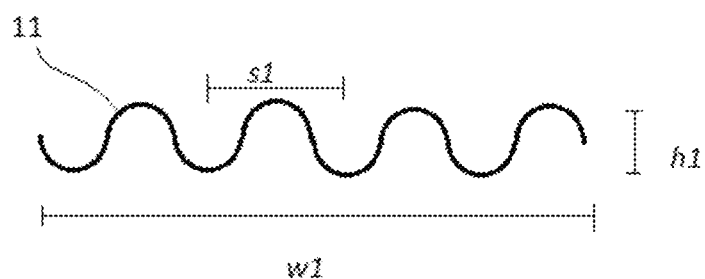

An undulating structure is formed into the mesh or screen sheet 11 using rollers 12. Rollers 12 may include one or more flutes, ridges, valleys, recesses, or any other raised lowered portions to impart an undulating structure to the mesh or screen 11 when passed through the rollers. Rollers 12 may be adjacent one another, or offset. The rollers 12 impart the undulating structure to the mesh or screen sheet 11 by deforming the mesh or screen sheet 11. FIG. 1b shows one example of an undulating structure. FIG. 1b shows a corrugated structure having a plurality of peaks and valleys. The mesh or screen sheet 11 is shown having a width w1, a height h1, and a spacing s1 between adjacent valleys. Spacing s1 shown being consistent for both the peaks and the valleys, but may be inconsistent as discussed below. In one aspect, height h1 may be in the range of 0.2 mm to 2.0 mm and spacing s1 between adjacent peaks may be in the range of 0.2 mm to 3.0 mm. For example, in certain embodiments, the height h1 may be at least 0.4 mm, at least 0.6 mm, at least 0.8 mm, at least 1.0 mm, at least 1.2 mm, at least 1.4 mm, at least 1.6 mm, and at least 1.8 mm. Similarly, in certain embodiments, the spacing s1 between adjacent peaks may be at least 0.4 mm, at least 0.6 mm, at least 0.8 mm, at least 1.0 mm, at least 1.2 mm, at least 1.4 mm, at least 1.6 mm, at least 1.8 mm, at least 2.0 mm, at least 2.2 mm, at least 2.4 mm, at least 2.6 mm, and at, least 2.8 mm. A ratio of the height h1 to spacing s1 may be in the range of 5 to 1 (5:1) to 1 to 15 (1:15), such as, for example, 3:1, 2:1, 1:1, 1:2, 1:3, 1:5, and 1:10.

While only two rollers 12 are illustrated in FIG. 1a, it is understood that more or less rollers may be used. For example, the undulating structure may be formed with a single roller, or using three or more rollers. Additionally, while FIG. 1a shows rollers 12 arranged, perpendicular to roll 10, some embodiments may include rollers 12 arranged parallel to roll 10 in order to form an undulating structure parallel to the length of mesh or screen sheet 11.

Figure 1C:
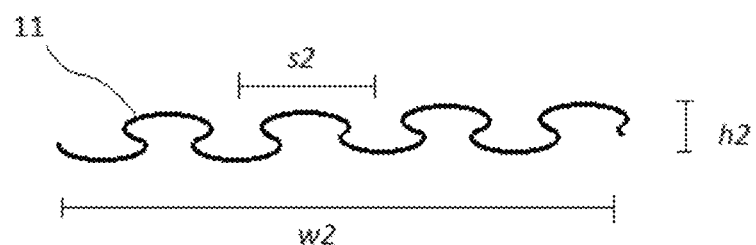

Subsequent to passing through rollers 12, the mesh or screen sheet 11 may pass through a calendering roller 13 in-line with the rollers 12. Calendering roller 13 roar include one or more rollers having a substantially smooth or flat surface. (Calendering roller 13 may include a hard metal roller on one side and a soft felt or paper roller on the other. The one or more rollers may be adjacent one another, or offset. Calendering roller 13 is arranged to press or partially flatten the corrugated feature to achieve a desired finial height, elastic compliance, yield strength, and/or flow resistance. As can be seen in FIG. 1c, the height h2 of the mesh or screen sheet 11 is less than the height h1 shown in FIG. 1b. Height h1 may be approximately 30% higher than the desired final height. For example, rollers 12 may form an undulating structure having a height h1 of approximately 0.67 mm. Upon calendering, the height h2 may be approximately 0.52 mm. Width w2 may be substantially similar to, slightly larger than, or slightly smaller than width w1. In one aspect, a height of the pressed or flattened undulating structure may range from 0.2 mm to 1.5 mm, such as, for example, from 0.2 mm to 1.3 mm, from 0.2 mm to 1.1 mm, from 0.2 mm to 1.0 mm, from 0.2 mm to 0.8 mm, from 0.2 mm to 0.6 mm, from 0.2 mm to 0.4 mm, from 0.4 mm to 1.5 mm, 0.4 mm to 1.3 mm, from 0.4 mm to 1.1 mm, from 0.4 mm to 1.0 mm, from 0.4 mm to 0.8 mm, from 0.4 mm to 0.6 mm, 0.6 mm to 1.5 mm, 0.6 mm to 1.3 mm, from 0.6 mm to 1.1 mm, from 0.6 mm to 1.0 mm, from 0.6 mm to 0.8 mm, 0.8 mm to 1.3 mm, 0.8 mm to 1.3 mm, from 0.8 mm to 1.1 mm, from 0.8 mm to 1.0 mm, 1.0 mm to 1.5 mm, 1.0 mm to 1.3 mm, from 1.0 mm to 1.1 mm, from 1.1 mm to 1.5 mm, from 1.1 mm to 1.3 mm, and from 1.3 mm to 1.5 mm. Calendering the undulating structure may lead to a yield strength of the pressed or flattened undulating structure range from 5 kgF/cm$^2$ to 200 kgF/cm$^2$, such as, for example, from 25 kgF/cm$^2$ to 200 kgF/cm$^2$, 50 kgF/cm$^2$ to 200 kgF/cm$^2$, 75 kgF/cm$^2$ to 200 kgF/cm$^2$, from 100 kgF/cm$^2$ to 200 kgF/cm$^2$, 125 kgF/cm$^2$ to 200 kgF/cm$^2$, 150 kgF/cm$^2$ to 200 kgF/cm$^2$, from 175 kgF/cm$^2$ to 200 kgF/cm$^2$, from 5 kgF/cm$^2$ to 175 kgF/cm$^2$, from 25 kgF/cm$^2$ to 175 kgF/cm$^2$, from 50 kgF/cm$^2$ to 175 kgF/cm$^2$, from 75 kgF/cm$^2$ to 175 kgF/cm$^2$, from 100 kgF/cm$^2$ to 175 kgF/cm$^2$, 125 kgF/cm$^2$ to 175 kgF/cm$^2$, from 150 kgF/cm$^2$ to 175 kgF/cm$^2$, from 5 kgF/cm$^2$ to 150 kgF/cm$^2$, from 25 kgF/cm$^2$ to 150 kgF/cm$^2$, from 50 kgF/cm$^2$ to 150 kgF/cm$^2$, from 75 kgF/cm$^2$ to 150 kgF/cm$^2$, from 100 kgF/cm$^2$ to 150 kgF/cm$^2$, from 125 kgF/cm$^2$ to 150 kgF/cm$^2$, from 5 kgF/cm$^2$ to 123 kgF/cm$^2$, from 25 kgF/cm$^2$ to 125 kgF/cm$^2$, from 50 kgF/cm$^2$ to 125 kgF/cm$^2$, from 73 kgF/cm$^2$ to 125 kgF/cm$^2$, from 100 kgF/cm$^2$ to 125 kgF/cm$^2$, from 5 kgF/cm$^2$ to 100 kgF/cm$^2$, from 25 kgF/cm$^2$ to 100 kgF/cm$^2$, from 50 kgF/cm$^2$ to 100 kgF/cm$^2$, from 75 kgF/cm$^2$ to 100 kgF/cm$^2$, from 5 kgF/cm$^2$ to 75 kgF/cm$^2$, from 25 kgF/cm$^2$ to 75 kgF/cm$^2$, from 50 kgF/cm$^2$ to 75 kgF/cm$^2$, from 5 kgF/cm$^2$ to 500 kgF/cm$^2$, from 25 kgF/cm$^2$ to 50 kgF/cm$^2$, and from 5 kgF/cm$^2$ to 25 kgF/cm$^2$.

One or more edges of the mesh or screen sheet 11 may be treated before or after passing through rollers 12, or before or after passing through the calendaring roller 13. Treating the edges will reduce the likelihood of damaged, frayed, or otherwise separated filaments at the one or more edges. Damaged, frayed, or otherwise separated filaments may pierce an electrochemical membrane or otherwise injure the fuel cell. Treatment may include weaving in loose wires or filaments at one or more of the edges, folding the one or more of the edges, pressing the one or more of the edges, flattening one or more of the edges, hemming one or more of the edges, compressing one or more of the edges, encapsulating one or more of the edges, or any combination thereof. Treatment of the one or more edges may include modification of the mesh or screen sheet 11 to include another material, such as when encapsulating, the one or more edges. In addition, one or more edges of the mesh or screen sheet 11 may be treated, for example, by laser cutting, laser fusing, thermal cutting, thermal fusing, the cutting, roller blade cutting, brushing and/or shearing.

While the process described above may result in a final desired width for the structure, the structure may be cut to am desired length. Cutting may be performed with any standard cutting equipment: that will not damage or modify the undulating structure.

Figure 2:
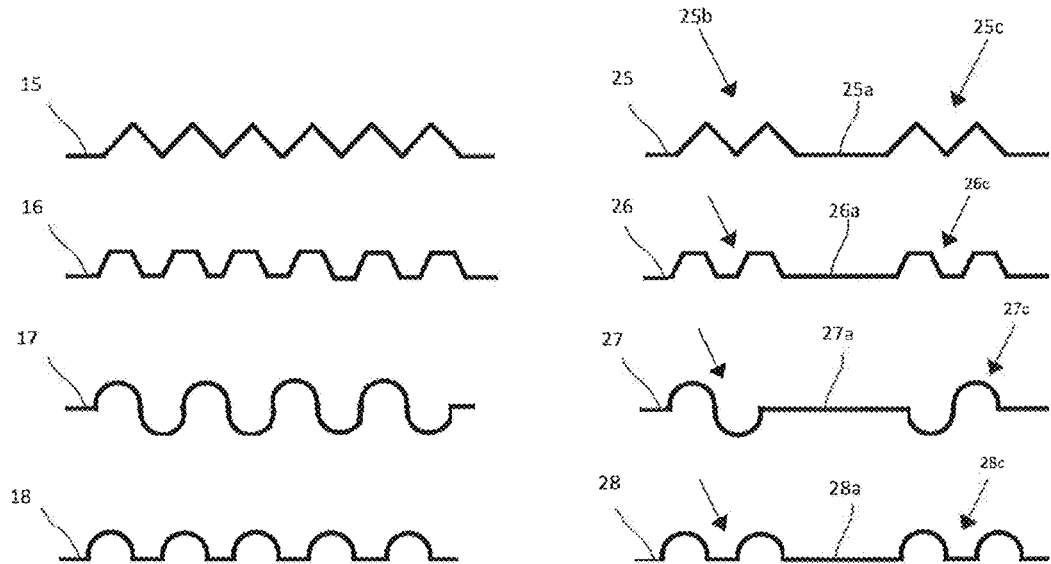
FIGS. 2 and 2A illustrate various cross-sectional arrangements for an undulating structure of a fuel cell.

The undulating structure may include a plurality of peaks and valleys or alternating ridges and grooves. The undulating structure may include a pleated feature, a corrugated feature, or a serpentine feature. A pleated feature may be formed by folding or doubling the mesh or screen sheet in any manner. In addition to the process described above, a textile pleating machine may be used to form the pleated feature. A serpentine feature may be form; d in any of the previously discussed manners and include any irregular inconsistent pattern of peaks and valleys or alternating ridges and grooves. FIG. 2 illustrates cross-sections for various undulating structures. Mesh or screen sheet 15 is shown having a plurality of sharp peaks and valleys. The peaks and valleys may be uniformly spaced, or may having irregular spacing. For example, mesh or screen sheet 25 is shown with a first set of peaks and 25b and a second set of peaks and valleys 25c spaced by gap 25a. Mesh or screen sheet 16 is shown having a plurality of peaks and valleys having a flat portion. The peaks and valleys may be uniformly spaced, or may having irregular spacing. For example, mesh or screen sheet 26 is shown with a first set of peaks and valleys 26b and a second set of peaks and valleys 25c spaced by gap 26a. Mesh or screen sheet 17 is shown having, a plurality of sinusoidal peaks and valleys. The peaks and valleys may be uniformly spaced, or may having irregular spacing. For example, mesh or screen sheet 27 is shown with a first set of peaks and valleys 27b and a second set of peaks and alleys 27c spaced by gap 27a. Mesh or screen sheet 18 is shown having a plurality of semicircular pears. The peaks may be uniformly spaced, or may having irregular spacing. For example, mesh or screen sheet 28 is shown with a first set of peaks 28b and a second set of peaks 28c spaced by gap 28a. While not shown, the undulating structure may include only valleys. Furthermore, the undulating structure may include more than one cross-sectional shape and may include irregular spacing. For example, the undulating, structure may be comprised of sharp peaks separated by semi-circular valleys.

Figure 2A:
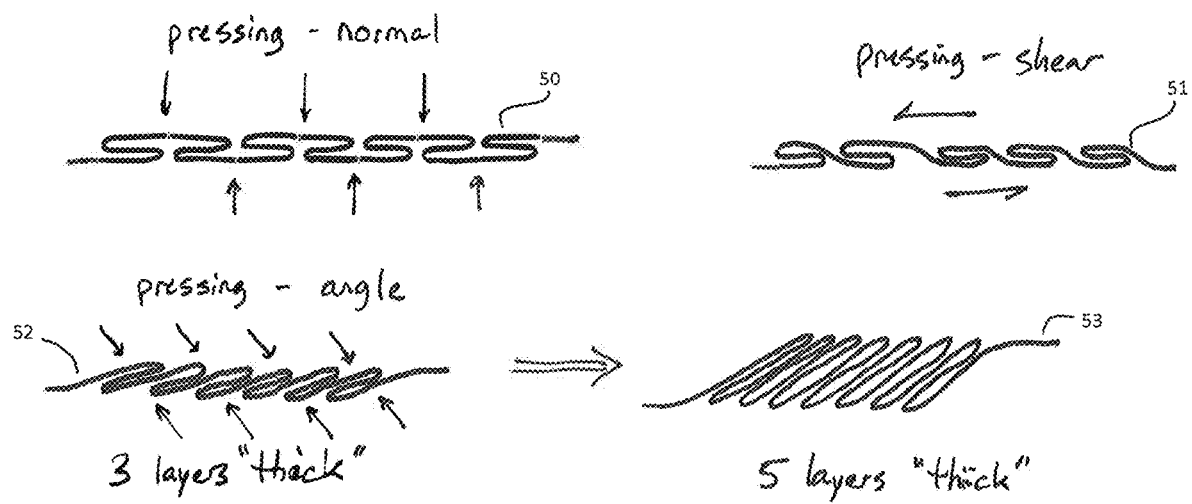

FIG. 2A illustrates cross-sections of various undulating structures having been mechanically treated, such as by pressing, flattening, or calendering. Mesh or screen sheet 50 is shown having been pressed or flattened normal to the plane of the sheet 50. Mesh or screen sheet 51 is shown having been pressed or flattened in a shearing motion. Mesh or screen sheet 52 is shown having been pressed or flattened at an angle. The resulting undulating structure includes three layers of mesh or screen indicated at arrows. Mesh or screen sheet 53 is shown having been pressed or flattened at an angle to create five layers of mesh or screen. The angle at which the undulating structure may be pressed or flattened may be any angle between 1 degree and 90 degrees.

The method may additionally include cleaning or passivizing the undulating structure. The cleaning or passivating may include one or more of ultrasonic treatment, acid wash, immersion treatment, and electrochemical treatment. Cleaning and passivating may be dependent on the material used and the desired use of undulating structure. Additionally, the undulating structure may be annealed or otherwise heat treated.

In one aspect, one or a plurality of structures may be used to create a flow field for a fuel cell. The flow mat include one or plurality of metal meshes or screens. Each of the one or plurality of metal meshes or screens may be formed as discussed above and may include a plurality of peaks and valley. The plurality of structures may be chemically, mechanically, or metallurgically joined to one another or to other structures within the fuel cell or may simply be placed adjacent to one another. For example, portions may be interwoven together, or joined by "hooking" via co-penetration subsequent to application of compressive force, tying, or encircling. In one aspect, the one or plurality of structures may fern an open flow field on both sides of an electrochemical membrane. In another aspect, the one or plurality of structure may be used in an open flow field on one side of an electrochemical membrane. A plurality of structures may be used as electrically conductive spacers to create passages in an anode compartment and a cathode compartment respectively. These spaces may also sets as flow fields through which reactant gases and product water are convected. Additionally, an electrode catalyst may be deposited on to one or more of the plurality of structures forming the flow field.

Figure 3:
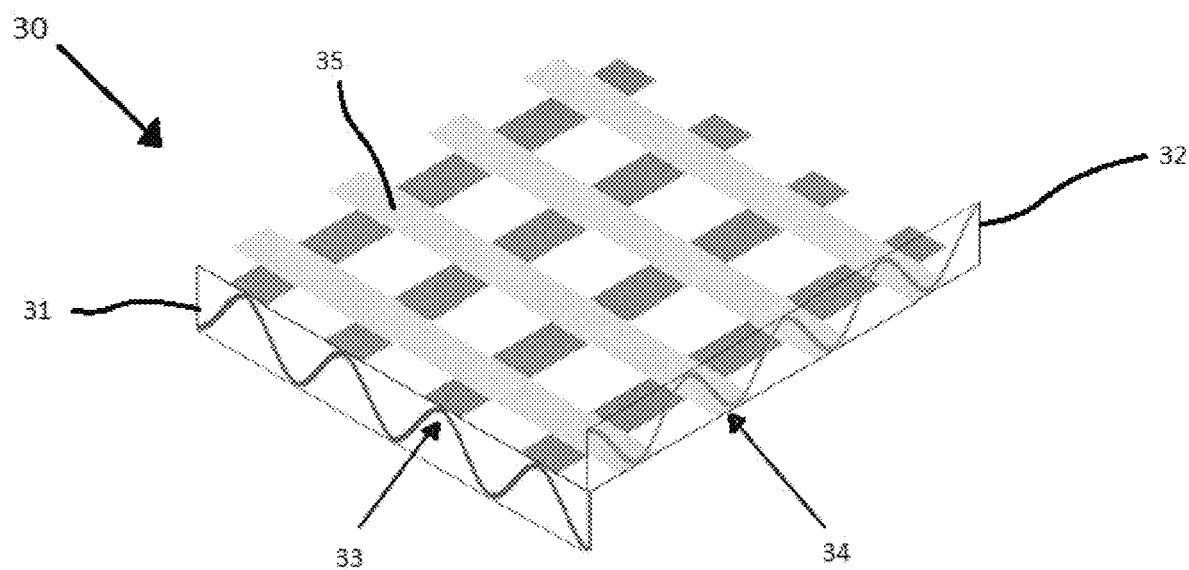
FIG. 3 illustrates a flow field including a first and second undulating structure.

FIG. 3 illustrates a flow field of a fuel cell including a first undulating structure 31 and a second undulating structure 32. First undulating structure 31 and second undulating structure 32 may be formed in accordance with a process as described above. First undulating structure may be positioned within an anode of a fuel cell while second undulating structure 32 may be positioned within a cathode of the fuel cell. An electrochemical membrane (not shown) may be positioned between the first undulating structure 31 and second undulating structure 32. The peaks and valleys of first undulating structure 31 are positioned perpendicular to the peaks and valleys of the second undulating structure 32. Such an arrangement allows for the areas supporting the electromechanical membrane (not shown) to form a square dot grid compression pattern 35 where valleys 34 of second undulating structure 32 meet peaks 33 of first undulating structure 31. This arrangement ensures the electrochemical membrane (not shown) is adequately supported from both sides, and avoids damage to the electrochemical membrane.

Thus, in accordance with a fuel cell described in this embodiment, a first corrugated mesh or screen positioned within an anode of the fuel cell, a second corrugated mesh or screen positioned within a cathode of the fuel cell, and a membrane positioned between the first corrugated mesh or screen and the second corrugated mesh or screen. The first corrugated mesh or screen can be positioned perpendicular to the second corrugated mesh or screen m order to create a square dot grid pattern. In some embodiments, the corrugations of the first corrugated mesh or screen form a zigzag pattern, and in other embodiments, the corrugations of the second corrugated mesh or screen form a zigzag pattern. The zigzag pattern of the first corrugated mesh or screen can be perpendicular to the zigzag pattern of the second corrugated mesh or screen. In other embodiments, the first corrugated mesh or screen and the second corrugated mesh or screen form an open flow field on both sides of the membrane. In additional embodiments, the first corrugated mesh or screen or the second corrupted mesh or screen form one of a current collector mesh or screen, membrane support mesh or screen, flow field structure, and as diffusion electrode.

Another aspect of the present disclosure is directed to a fuel cell comprising a cathode, an anode, and a membrane interposed between the cathode and the anode, and a first open flow Field comprising a first mesh or screen, wherein the first mesh or screen includes a plurality of corrugations. The cathode and/or anode may include a plurality of channels. The plurality of corrugations in the open flow field form an undulating structure, and the plurality corrugations may be at an angle with respect to the plurality of channels. The angle may be at least 45 degrees. In some embodiments the angle may be 90 degrees or less. For example, the angle may range from 45 degrees to 90 degrees, such as, for example, from 45 degrees to 75 degrees, from 45 degrees to 60 degrees, from 60 degrees to 90 degrees, from 60 degrees to 75 degrees, and from 75 degrees to 90 degrees.

In certain embodiments, the fuel cell further comprises a second open flow field comprising a second corrugated mesh or screen, wherein the second mesh or screen includes a plurality of corrugations. In other embodiments, the first open flow field or the second open flow filed includes a third mesh or screen, wherein the third mesh or screen includes a plurality of corrugations.

In some embodiments, the open flow field may include at least one first mesh or screen having a plurality of corrugations. In some embodiments the open flow field may include, a first, second, and third mesh screen having a plurality of corrugations. In some embodiments, the first mesh or screen and the second mesh or screen may include a Zigzag pattern having a pattern angle ranging from 1 degree to 90 degrees, such as, for example, from 5 degrees to 90 degrees, from 10 degrees to 90 degrees, from 25 degrees to 90 degrees, from 45 degrees to 90 degrees, from 60 degrees to 90 degrees, from 75 degrees to 90 degrees, from 1 degree to 75 degrees, from 5 degrees to 75 degrees, from 10 degrees to 75 degrees, from 25 degrees to 75 degrees, from 45 degrees to 75 degrees, from 60 degrees to 75 degrees, from 1 degree to 60 degrees, from 5 degrees to 60 degrees, from 10 degrees to 60 degrees, from 25 degrees to 60 degrees, from 45 degrees to 60 degrees, from 1 degree to 45 degrees, from 5 degrees to 45 degrees, from 10 degrees to 45 degrees, and from 25 degrees to 45 degrees. In some embodiments, the pattern angle may be the same for the first mesh or screen and the second mesh or screen. In some embodiments, the pattern angle may be different.

In some embodiments, the first mesh or screen includes a first zigzag pattern and the second mesh or screen includes a second zigzag pattern. The first zigzag pattern and the second zigzag pattern may be the same or different. In some aspects, the first zigzag pattern is positioned at an angle relative to the second zigzag pattern. This angle can range from 1 degree to 90 degrees, such as, for example, from 5 degrees to 90 degrees, from 10 degrees to 90 degrees, from 25 degrees to 90 degrees, from 45 degrees to 90 degrees, from 60 degrees to 90 degrees, from 75 degrees to 90 degrees, from 1 degree to 75 degrees, from 5 degrees to 75 degrees, from 10 degrees to 75 degrees, from 25 degrees to 75 degrees, from 45 degrees to 75 degrees, from 60 degrees to 75 degrees, from 1 degree to 60 degrees, from 5 degrees to 60 degrees, from 10 degrees to 60 degrees, from 25 degrees to 60 degrees, from 45 degrees to 60 degrees, from 1 degree to 45 degrees, from 5 degrees to 45 degrees, from 10 degrees to 45 degrees, and from 25 degrees to 45 degrees. In some embodiments, the first zigzag pattern is positioned at an angle relative to the second zigzag pattern such that the first zigzag pattern is perpendicular to the second zigzag pattern.

Figure 4:
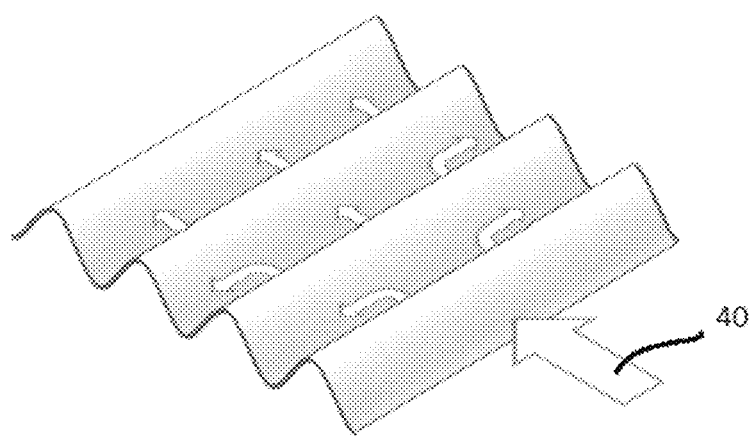
FIG. 4 illustrates the general flow direction through an undulating structure.

In one flow configuration, the general flow direction 40 is perpendicular to the direction of the peaks and valleys in the undulating structure. Non-uniformities in flow at the inlet and/or outlet of the flow field are quickly dissipated by the high permeability of the flow field in the direction of the corrugations, as shown in FIG. 4. In one aspect, a fuel cell may include an open flow field having a general flow direction 40 formed of one or more meshes or screens having an undulating structure. The flow permeability in a direction perpendicular to the general flow direction 40 is higher than the flow permeability in a direction parallel to the general flow direction. The flow permeability is a function of the size of the openings of a mesh or screen including the undulating structure, the height of the undulating structure, the width of the undulating structure, the spacing of peaks and valleys in the undulating structure, the thickness of the wire forming, the mesh or screen, and any surface treatments applied to the mesh or screen. These parameters may be adjusted to create a ratio of the flow permeability in a direction perpendicular to the general flow direction to the flog permeability in a direction parallel to the general flow direction of at least 1.05:1. In some embodiments, the ratio of the flow permeability in a direction perpendicular to the general flow direction to the flow permeability in a direction parallel to the general flow direction may range from 20:1 to 1.05:1 such as, for example, from: 15:1, 10:1, 5:1, 3:1, 2:1, 1.5:1, 1.4:1, 1.3:1, 1.25:1, 1.2:1, 1.15:1, and 1.1:1. In some embodiments, the flow permeability in a direction perpendicular to the general flow direction may be at least two times greater than the flow permeability in a direction parallel to the general flow direction. In mine embodiments, the open flow field comprises at least one undulating structure, and in other embodiments, the open flow field comprises a corrugated mesh or screen.

Figure 5:
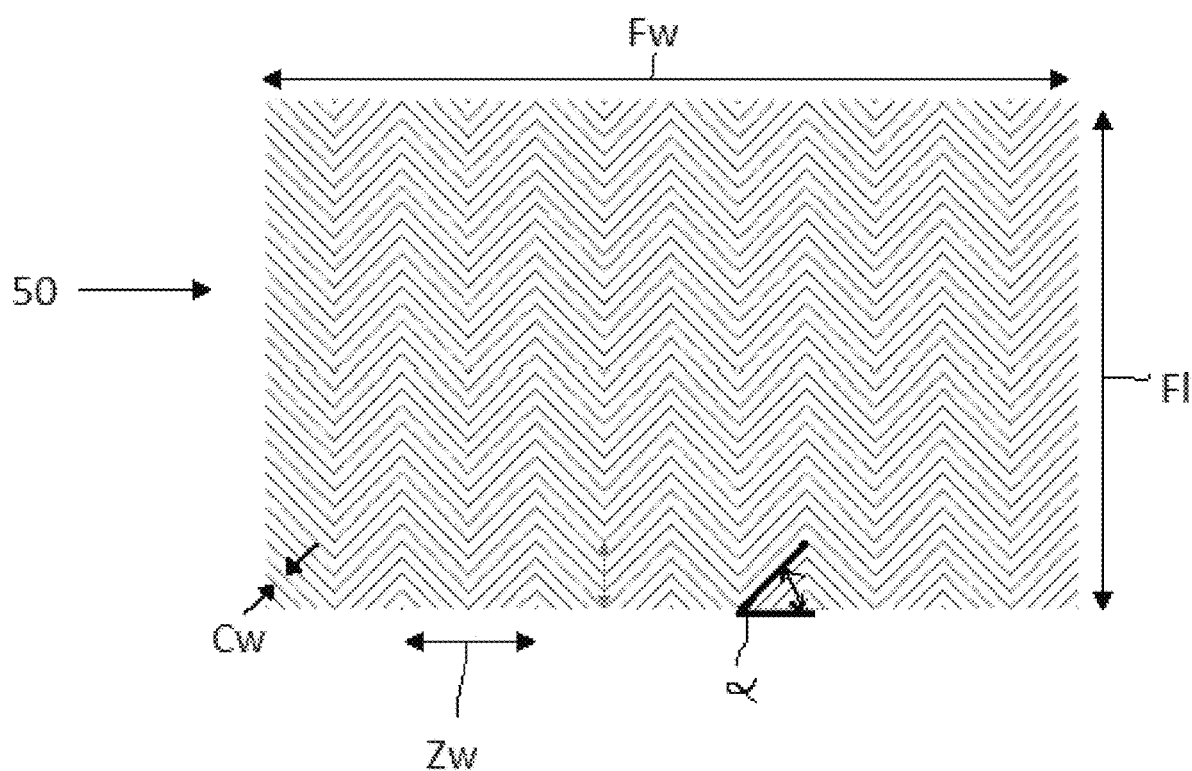
FIG. 5 shows, undulations of a structure arranged in a zigzag pattern.

To FIG. 5, a zigzag pattern 50 for the peaks and valleys of an undulating structure of a flow field is illustrated. In such a configuration, the general flow direction of both the cathode and anode may be perpendicular to the zigzag direction and high permeability perpendicular to the general flow direction is maintained. While a zigzag pattern is shown, a pattern having a wave or sinusoidal shape may also be used. The zigzag pattern 50 may be included in one or more of the undulating structures positioned within an anode and cathode. It is noted that a plurality of undulating structures may be positioned in both the anode and cathode. The flow field includes a length Fl and width Fw. The zigzag pattern may be offset by zigzag pattern angle α and include a zigzag pattern width Zw. Zigzag pattern angle α may range from 1 degree to 90 degrees, such as, for example, from 5 degrees to 90 degrees, from 10 degrees to 90 degrees, from 25 degrees to 90 degrees, from 45 degrees to 90 degrees, from 60 degrees to 90 degrees, from 75 degrees to 90 degrees, from 1 degree to 75 degrees, from 5 degrees to 75 degrees, from 10 degrees to 75 degrees, from 25 degrees to 75 degrees, from 45 degrees to 75 degrees, from 60 degrees to 75 degrees, from 1 degree to 60 degrees, from 5 degrees to 60 degrees, from 10 degrees to 60 degrees, from 25 degrees to 60 degrees, from 45 degrees to 60 degrees, from 1 degree to 45 degrees, from 5 degrees to 45 degrees, from 10 degrees to 45 degrees, and from 25 degrees to 45 degrees. Each peak and valley may include width Cw. When the zigzag pattern alternates between the anode and cathode, a square dot grid compression pattern is maintained. For example, in shifting the pattern for a second structure along the for axis of a first structure by a value of (Zw/2), a square dot grid compression pattern is maintained.

In another aspect, a fuel cell may include art anode open flow field having a plurality of channels having a repeating pattern including a first periodicity, and a cathode open flow field having a plurality of channels having a repeating pattern including a second periodicity, wherein the plurality of channels of the anode open flow field and the plurality of channels of the cathode open flow field are positioned such that the first periodicity and the second periodicity are out of phase by an amount ranging from 90 degrees to 270 degrees, such as, for example, from 90 degrees to 225 degrees, from 90 degrees to 180 degrees, from 90 degrees to 135 degrees, from 135 degrees to 270 degrees, from 135 degrees to 225 degrees, from 135 degrees to 180 degrees, from 180 degrees to 270 degrees, from 180 degrees to 225 degrees, and from 225 degrees to 270 degrees. In certain embodiments, the plurality of channels of the anode open flow field and the plurality of channels of the cathode open flow field are positioned such that the first periodicity and the second periodicity are out of phase 180 degrees. In some embodiments, the first and second periodicity may be the same. In some embodiments, the first and second periodicity may be different.

Figure 6:
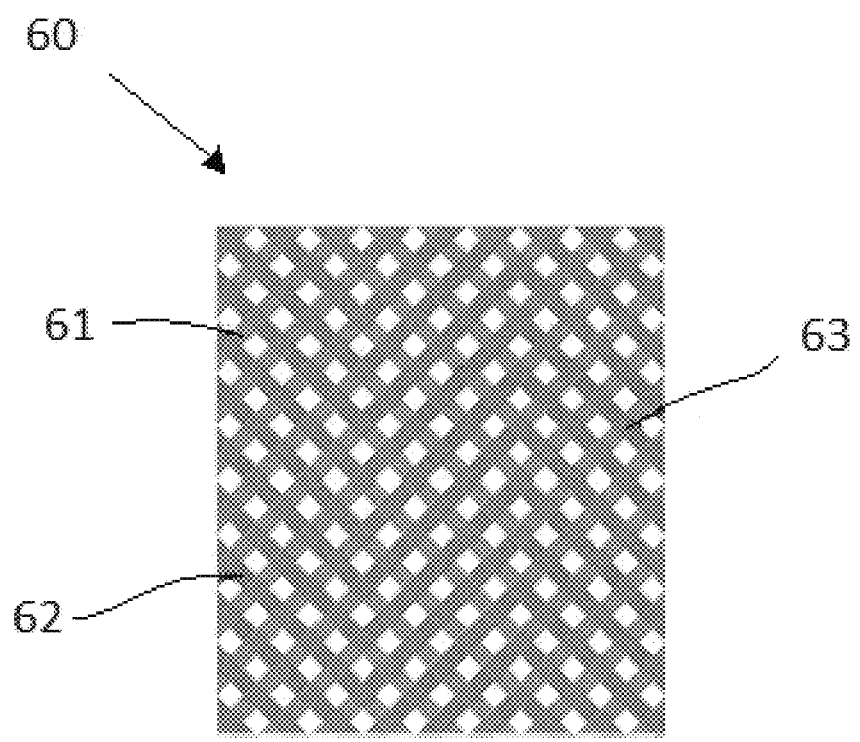
FIG. 6 illustrates a compression pattern produced by alternating a zigzag pattern for a flow Field.

FIG. 6 illustrates flow field 60 with such a configuration. As shown, valleys 61 of a cathode undulating structure meet with peaks 62 of an anode undulating, structure to form square dot grid compression pattern 63. As discussed above, this arrangement ensures the electrochemical membrane (pot shown) is adequately supported from both sides.

In another aspect, an open flow field for a fuel cell having a flow direction may comprise at least one screen, mesh, foam, or expanded metal, and at least one flow channel, wherein the at least one flow channel extends in a direction intersecting the flow direction. In some embodiments, the at least one flow channel extends partially across a width of the flow field. The screen, mesh, foam, or expanded metal may include one or more undulating strictures. The flow channel may comprise a plurality of undulating structures, and in certain embodiments these undulating structures comprise or pleats. In one aspect, the at least one flow channel is straight. In one aspect the flow channel may include least one bend or curve. The bend or curve may be sharp or gradual, and may include a series of curves or bends. In some embodiments, the flow channel may be parallel to a plurality of other flow channels each which intersect with the flow direction.

In one aspect, the at least one flow channel may intersect with the flow direction at an angle ranging from 1 degree to 180 degrees, such as, for example, from 15 degrees to 180 degrees, from 30 degrees to 180 degrees, from 45 degrees to 180 degrees, from 60 degrees to 180 degrees, from 75 degree to 180 degrees, from 90 degrees to 180 degrees, from 105 degrees, to 180 degrees, from 120 degrees to 180 degrees, from 135 degrees to 180 degrees, from 150 degrees to 180 degrees, from 165 degrees to 180 degrees, from 1 degree 135 degrees, from 15 degrees to 135 degrees, from 30 degrees to 135 degrees, from 45 degrees to 135 degrees, from 60 degrees to 135 degrees, from 75 degrees to 135 degrees, from 90 degrees to 135 degrees, from 103 degrees to 135 degrees, from 120 degrees to 135 degrees, from 1 degree to 90 degrees, from 15 degrees to 90 degrees, from 30 degrees to 90 degrees from 45 degrees to 90 degrees, from 60 degrees to 90 degrees, from 75 degrees to 90 degrees, from 1 degrees to 75 degrees, from 15 degrees to 75 degrees, from 30 degrees to 75 degrees, from 45 degrees to 75 degrees, from 60 degrees to 75 degrees, from 1 degree to 60 degrees, from 15 degrees to 60 degrees, from 30 degrees to 60 degrees, from 45 degrees to 60 degrees, from 1 degree to 45 degrees, from 15 degrees to 45 degrees, from 30 degrees to 45 degrees, from 1 degrees, to 30 degrees and from 15 to 30 degrees.

A further embodiment of the present disclosure is directed to a fuel cell, comprising, a cathode, an anode, and a membrane interposed between the cathode and the anode; and an open flow field including a plurality of flow channels having a wave, zigzag, or sinusoidal shape, wherein the flow channels repeat across the open flow field. In some embodiments the flow channels are arranged to intersect with a flow direction of the open flow field, and in further aspects the flow channels intersect the flow direction at an angle between 1 degree and 90 degrees such as, for example, from 15 degrees to 90 degrees, from 30 degrees to 90 degrees, from 45 degrees to 90 degrees, from 60 degrees to 90 degrees, from 75 degrees to 90 degrees, from 1 degrees to 75 degrees, from 15 degrees to 75 degrees, from 30 degrees to 75 degrees, from 45 degrees to 75 degrees, from 60 degrees to 75 degrees from 1 degree to 60 degrees, from 15 to 60 degrees, from 30 degrees to 60 degrees, from 45 degrees to 60 degrees, from 1 degree to 45 degrees, from 15 degrees to 45 degrees from 30 degrees to 45 degrees 1 degrees to 30 degrees and from 15 to 30 degrees. In some aspects, the flow channels are perpendicular with a flow direction of the open flow field. In other aspects, a permeability along the flow channels is greater than a permeability along the flow direction.

While exemplary embodiments for structures e been set forth herein. It will be apparent to those skilled in the art that various modifications and variations can be made without departing from the spirit of the present disclosure.

What is claimed is:

1. A method of making a structure for a fuel cell, comprising:
   providing a mesh or screen sheet having one or more edges;
   using rollers to form the mesh or screen sheet into an undulating structure; and
   treating one or more of the edges;
      wherein the treating one or more of the edges includes at least one of weaving one or more of the edges, flattening one or more of the edges, hemming one or more of the edges, compressing one or more of the edges, folding one or more of the edges, cutting one or more of the edges, fusing one or more of the edges, brushing one or more of the edges, or encapsulating one or more of the edges; and then
   pressing or flattening the undulating structure with a calendering roller.

2. A method of making a structure for a fuel cell according to claim 1,
   wherein a height of the pressed or flattened undulating structure is between 0.2 mm and 1.5 mm.

3. A method of making a structure for a fuel cell according to claim 1, wherein a yield strength of the pressed or flattened undulating structure is between 5 kgF/cm2 and 200 kgF/cm2.

4. A method of making a structure for a fuel cell according to claim 1, further comprising cleaning or passivating the undulating structure.

5. A method of making a structure for a fuel cell according to claim 1, wherein the cleaning or passivating includes one or more of ultrasonic treatment, acid wash, immersion treatment, and electrochemical treatment.

6. A method of making a structure for a fuel cell according to claim 1, wherein the mesh or screen sheet is woven wire.

7. A method of making a structure for a fuel cell according to claim 1, wherein the mesh or screen sheet is expanded metal.

8. A method of making a structure for a fuel cell according to claim 1, wherein the undulating structure includes a pleated feature.

9. A method of making a structure for a fuel cell according to claim 1, wherein the undulating structure includes a corrugated feature.

10. A method of making a structure for a fuel cell according to claim 1, wherein the undulating structure includes a serpentine feature.

11. A method of making a structure for a fuel cell according to claim 1, wherein a height of the undulating structure is in the range of 0.2 mm to 2.0 mm.

12. A method of making a structure for a fuel cell according to claim 1, wherein a distance between adjacent peaks of the undulating feature is in the range of 0.2 mm to 3.0 mm.

13. A method of making a structure for a fuel cell according to claim 1, wherein the screen or mesh sheet is formed of stainless steel, Chromium, Niobium, Zirconium, Nickel, Silver, Titanium, or alloys thereof.

14. A method of making a structure for a fuel cell according to claim 13, wherein the stainless steel is austenitic stainless steel.

15. A method of making a structure for a fuel cell according to claim 1, wherein the screen or mesh sheet comprises wire having a diameter between 0.015 inches to 0.0005 inches.

16. A method of making a structure for a fuel cell according to claim 1, wherein the screen or mesh sheet is a mesh having dimensions of 30 mesh to 500 mesh.

* * * * *